Patented Nov. 30, 1937

2,100,391

UNITED STATES PATENT OFFICE 2,100,391

VITREOUS COMPOSITIONS OR GLASSES

Hans Georg Grimm, Heidelberg, and Paul Huppert, Mannheim, Germany, assignors to I. G. Farbenindustrie Aktiengesellschaft, Frankfort-on-the-Main, Germany No Drawing. Application August 12, 1936, Serial No. 95,630

11 Claims. (Cl. 106—36.1)

The present application is a continuation-in-part to our prior application Ser. No. 671,198, filed on May 15, 1933, which in turn is a continuation-in-part to our prior application Serial No. 559,493, filed on August 26, 1931, now Patent 1,964,629, issued June 26, 1934.

The present invention relates to new vitreous compositions or glasses containing aluminum oxide and phosphorus pentoxide and process of producing same.

We have found that clear vitreous compositions or glasses having valuable properties are obtained by fusing glass compositions comprising an oxidic component and a vitrifying component the latter consisting to an amount of between 10 and 100 per cent of a composition of $Al_2O_3$ and $P_2O_5$ or of compounds yielding these substances, aluminum oxide being present in a proportion which reckoned on $P_2O_5$ is larger than that present in $AlPO_4$ but does not exceed 4 parts by weight per each part of phosphorus pentoxide. The said composition of the vitrifying component imparts to glasses some distinct most valuable advantages such as a high resistivity against water and low coefficient of expansion and, in cases in which no substantial amounts of substances absorbing ultraviolet rays such as $Fe_2O_3$, $TiO_2$, PbO, $CeO_2$, are present, a high permeability for such rays; their permeability for ultraviolet rays is higher than that of highly permeable silicate glasses and may be nearly as high as that of quartz glass.

In cases in which the vitrifying component does not consist of $Al_2O_3$ and $P_2O_5$ only, the remaining part thereof may consist of any well known vitrifying agent for example silica and boric oxide ($B_2O_3$).

As oxidic components the same oxidic, especially basic components or mixtures thereof as are commonly used in the production of silica glasses may be used; the basic components are, generally speaking, used in the same proportions as is usual in the preparation of said glasses. In contradistinction to the different kinds of water glass which are soluble in water the glasses consisting of alkali metal oxide, aluminum oxide and phosphorus pentoxide in the proportions disclosed above are insoluble in water and are resistant to water as is ordinary window glass. As basic components preferably alkali metal oxides are employed in amounts of up to 40 per cent of the total weight of the glass; they may be present in small amounts, for example 1 to 2 per cent; if desired they are used together with up to 20 per cent of alkaline earth metal oxides reckoned on the total weight. Lead glasses containing vitreous components of the composition set forth above may contain considerable amounts of lead oxide namely up to 85 per cent of the total weight. Other divalent bases such as magnesium oxide and zinc oxide may be used.

The preparation of the new glasses is carried out in a similar manner to the preparation of silica glass. As a general indication of the composition of the batches for the new glasses it may be said that they may be composed in the same manner as those for silica glasses but replacing silica wholly or partially by aluminum oxide and phosphorus pentoxide, these compounds being present in the proportions disclosed above. A suitable manner of preparing glasses according to the present invention comprises starting with aluminum orthophosphate itself; the latter may directly be mixed with the other components of the batch. The preparation of the glasses may also be carried out by introducing the other components together with aluminum oxide into a phosphoric acid of any concentration whereupon the mixture is dehydrated and fused. It is, however, not necessary to introduce aluminum into the batch in the form of oxide or phosphate, but it may also be introduced in the form of a compound dissociating into oxide and a volatile compound, for example nitrate, hydroxide or sulphate of aluminum. Likewise the phosphoric acid may be used as such or in the form of meta- or pyro-phosphoric acid or a salt of a phosphoric acid. The aluminum compounds and the phosphoric acid must, however, always be present in the proportions disclosed above.

As already stated $Al_2O_3$ and $P_2O_5$ may be incorporated with the glass composition in the form of aluminum orthophosphate, or they may be added separately, or in a form of compounds yielding them in the required amounts. In this manner glasses of excellent properties are obtained. If larger amounts of $Al_2O_3$ reckoned on $P_2O_5$ are used than are present in $AlPO_4$ a marked lowering of the thermal coefficient of expansion and a simultaneous increase in the softening temperature of the glass is observed without increasing the tendency to devitrification which is especially important when working up the glasses by blowing in the lamp. Moreover, the coefficient of expansion of the glass also has a clearly positive temperature coefficient which is a great advantage especially for the working up of the glass for lamps, illuminating tubes or the like where it is necessary to fuse in wires or metallic electrodes. It is most astonishing that by increasing the proportion of $Al_2O_3$ up to the limit stated above no devitrification occurs.

If substantial amounts of silica are present in the glass the use of substantial amounts of tricalcium phosphate is to be avoided as in these cases the addition of substantial amounts of this compound would injure the clearness of the glass. The addition of boric oxide improves the workability by blowing and drawing the new glasses by reducing their tendency to devitrification and extending the range of temperature within which the glass can be worked up by improving the viscosity properties of the melt. The amount of boric oxide which may be added is larger than that usually employed with silica glass and may be as high as 40 per cent by weight of the glass.

The new glasses are suitable for use as window glass, especially for windows of hospitals and greenhouses, and for constructing optical combinations, for example combinations of lenses and prisms and also of all kinds of apparatus for testing or registering ultraviolet rays, for example according to photographic or photoelectric methods. Layers of the glasses having a thickness as comes into question for such purposes have permeabilities for ultraviolet rays up to about 2000 to 2200 Å. units. By selecting glasses of suitable compositions the physical properties such as the thermal coefficient of expansion, the softening temperature, the refraction index etc. may be varied within wide limits. For example, by starting with suitable proportions of the initial materials, the coefficient of expansion may be regulated within wide limits so as to permit fusing in wires or strips of any metal, for example within $\beta$ linear=about $30.10^{-7}$ and $\beta$ linear=about $90.10^{-7}$.

Furthermore the new glasses are highly suitable for constructing the transparent parts of lamps such as incandescent lamps and gaseous conduction lamps with gas or metal vapor. Due to the surprisingly high resistivity of the new glasses they can be brought into contact with the hot metals or metal vapors in metal vapor lamps, even in the case of lamps filled with alkali metals or other light metals, zinc, cadmium etc. Therefore they can be used with advantage also for the construction of lamps destined only for emitting visible light, e. g. sodium vapor lamps for road illumination. For such purposes the glasses need not be free from iron, titanium and other components imparing the permeability to ultraviolet rays and therefore the glasses, in such cases, can be made from very cheap raw materials.

The resistivity of the new glasses against the said metals makes them very suitable also as construction materials in other cases where the parts in question are exposed to hot alkali metal or other light metals, zinc, cadmium etc., e. g. for the construction or lining out of reaction or distillation vessels for processes working with the said metals. Some glass compositions particularly resistant to the said metals are:

|   | $K_2O$ | $Na_2O$ | CaO | BaO | MgO | $SiO_2$ | $Al_2O_3$ | $B_2O_3$ | $P_2O_5$ |
|---|---|---|---|---|---|---|---|---|---|
| A | 9,0 |  | 4,5 | 27,2 |  | 9,0 | 24,6 | 9,7 | 16,0 |
| B |  | 10,0 |  | 10,0 | 10,0 | 5,0 | 31,3 | 25,0 | 8,7 |
| C |  |  |  | 10,0 | 13,0 | 10,0 | 31,3 | 20,0 | 15,7 |
| D |  |  |  | 10,0 | 10,0 | 20,0 | 26,3 | 25,0 | 8,7 |
| E | 3,0 |  |  | 10,0 | 5,0 | 20,0 | 28,3 | 25,0 | 8,7 |

The following examples will further illustrate how the invention is carried out in practice, but the invention is not restricted thereto. The parts are by weight unless otherwise stated.

*Example 1*

By fusing together a mixture of 17.10 parts of sodium carbonate, 10.45 parts of magnesium carbonate, 35.46 parts of boric acid ($H_3BO_3$), 35.88 parts of aluminum oxide and 45.05 parts of an 89 per cent phosphoric acid ($H_3PO_4$) a glass is obtained which has an excellent permeability for ultraviolet light and the following proportions of glass-forming oxides:

|  | In molecular ratios | In percentage by weight |
|---|---|---|
| $Na_2O$ | 14.3 | 10.0 |
| MgO | 11.0 | 5.0 |
| $B_2O_3$ | 25.4 | 20.0 |
| $Al_2O_3$ | 31.2 | 35.82 |
| $P_2O_5$ | 18.1 | 29.12 |

The glass has a particularly low coefficient of expansion, the values of which for two different intervals of temperature are $\beta$ (linear) $=61.10^{-7}$
$\qquad$ 42° to 186° C.
$\beta$ (linear) $=65.10^{-7}$
$\qquad$ 42° to 361° C.

The softening temperature is 558° C. while that of the commercial Fischer fusible glass (produced by the firm Gustav Fischer at Thuenau, Germany) is taken as 565° C.

*Example 2*

By fusing a mixture of 23.50 parts of potassium carbonate, 5.36 parts of calcium carbonate, 10.45 parts of magnesium carbonate, 26.60 parts of boric acid ($H_3BO_3$), 32.46 parts of aluminum oxide and 44.18 parts of an 89 per cent phosphoric acid a glass is obtained having an excellent permeability for ultraviolet light and having the following composition:

|  | In molecular ratios | In percentage by weight |
|---|---|---|
| $K_2O$ | 15.7 | 16.0 |
| CaO | 4.9 | 3.0 |
| MgO | 11.5 | 5.0 |
| $B_2O_3$ | 19.9 | 15.0 |
| $Al_2O_3$ | 29.5 | 32.46 |
| $P_2O_5$ | 18.5 | 28.54 |

The coefficient of expansion of the glass is $\beta$ (linear) $=87.10^{-7}$
$\qquad$ 42° to 186° C.
$\beta$ (linear) $=91.10^{-7}$
$\qquad$ 42° to 357° C.

The softening point, with the assumption made in Example 1, is 555° C.

The glass is especially suitable for the fusing in of platinum the coefficient of expansion of which at average temperatures is about $89.10^{-7}$.

*Example 3*

1.71 parts of sodium carbonate, 3.58 parts of calcium carbonate, 25.05 parts of magnesium carbonate, 35.45 parts of boric acid ($H_3BO_3$), 10.00 parts of silica powder, 31.7 parts of aluminum oxide are mixed with 36.05 parts of a 89 per cent solution of phosphoric acid; the mixture is dehydrated and fused whereby a glass of excellent permeability for ultraviolet rays is obtained. It has the following composition:

|  | In molecular ratios | In percentage by weight |
|---|---|---|
| $Na_2O$ | 1.3 | 1.0 |
| $CaO$ | 2.8 | 2.0 |
| $MgO$ | 23.3 | 12.0 |
| $B_2O_3$ | 22.4 | 20.0 |
| $SiO_2$ | 13.0 | 10.0 |
| $Al_2O_3$ | 24.4 | 31.7 |
| $P_2O_5$ | 12.8 | 23.3 |

The coefficient of expansion of the glass is $\beta$ (linear) $= 43.10^{-7}$
43° to 188° C.
$\beta$ (linear) $= 47.10^{-7}$
43° to 362° C.

The softening point determined in the same manner as described in Example 1 is about 660° C.

As the coefficient of expansion of tungsten at between 100° and 200° C. is $45.10^{-7}$ the glass obtained is suitable for fusing in this metal.

Example 4

20.9 parts of magnesium oxide and 33.7 parts of aluminum oxide are worked up together with the same amounts of sodium oxide, calcium oxide, boric oxide, phosphorus pentoxide and silica as indicated in the preceding example. A glass is obtained containing 10.0 per cent by weight of magnesium oxide and 33.7 per cent of aluminum oxide (19.9 molecular per cent of MgO and 26.5 molecular per cent of aluminum oxide) the remaining components being present in the same proportions as indicated in the preceding example.

The coefficient of expansion of the glass is $\beta$ (linear) $= 38.10^{-7}$
43° to 188° C.
$\beta$ (linear) $= 43.10^{-7}$
43° to 357° C.

The softening temperature is about the same as indicated in the preceding example.

What we claim is:

1. A clear vitreous composition obtained by fusion and comprising an oxidic component and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed about 4 parts by weight per each part of $P_2O_5$.

2. A clear vitreous composition obtained by fusion and comprising a basic component and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 4 parts by weight per each part of $P_2O_5$.

3. A clear vitreous composition obtained by fusion and comprising an oxidic component and a vitrifying component containing between 10 and 100 per cent by weight of $Al_2O_3$ and $P_2O_5$, $Al_2O_3$ being present in proportions which, reckoned on $P_2O_5$, is larger than that present in $AlPO_4$, but does not exceed 4 parts by weight per each part of $P_2O_5$, the remaining part of the vitrifying component consisting of a compound selected from the group consisting of silica and boric acid.

4. A clear vitreous composition obtained by fusion and comprising an alkali metal oxide in amounts of up to 40 per cent calculated on the vitreous composition and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 4 parts by weight per each part of $P_2O_5$, the remaining part of the vitrifying component consisting of a compound selected from the group consisting of silica and boric acid.

5. A clear vitreous composition obtained by fusion and comprising a basic component consisting of an alkali metal oxide in amounts of up to 40 per cent together with up to 20 per cent of an alkaline earth metal oxide the said percentages being calculated on the vitreous composition and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 4 parts by weight per each part of $P_2O_5$, the remaining part of the vitrifying component consisting of a compound selected from the group consisting of silica and boric acid.

6. A clear vitreous composition obtained by fusion and comprising up to 85 per cent by weight of lead oxide calculated on the vitreous composition and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 4 parts by weight per each part of $P_2O_5$.

7. A clear vitreous composition obtained by fusion and comprising a basic component and a virtifying component containing up to 40 per cent of boric acid calculated on the vitreous composition, the said vitrifying component containing besides boric oxide between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 4 parts by weight per each part of $P_2O_5$.

8. A clear vitreous composition obtained by fusion and comprising a basic component and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 2 parts by weight per each part of $P_2O_5$.

9. A clear vitreous composition obtained by fusion and comprising an oxidic component and a vitrifying component containing between 10 and 100 per cent by weight of $Al_2O_3$ and $P_2O_5$, $Al_2O_3$ being present in proportions which, reckoned on $P_2O_5$, is larger than that present in $AlPO_4$, but does not exceed 2 parts by weight per each part of $P_2O_5$, the remaining part of the vitrifying component consisting of a compound selected from the group consisting of silica and boric acid.

10. A clear vitreous composition obtained by fusion and comprising an alkali metal oxide in amounts of up to 40 per cent calculated on the vitreous composition and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 2 parts by weight per each part of $P_2O_5$, the remaining part of the virtifying component consisting of a compound selected from the group consisting of silica and boric acid.

11. A clear vitreous composition obtained by fusion and comprising a basic component consisting of an alkali metal oxide in amounts of up to 40 per cent together with up to 20 per cent of an alkaline earth metal oxide the said percentages being calculated on the vitreous composition and a vitrifying component containing between 10 and 100 per cent by weight of $Al_2O_3$ and $P_2O_5$, $Al_2O_3$ being present in a proportion which, reckoned on $P_2O_5$, is larger than that present in $AlPO_4$, but does not exceed 2 parts by weight per each part of $P_2O_5$, the remaining part of the vitrifying component consisting of a compound selected from the group consisting of silica and boric acid.

HANS GEORG GRIMM.
PAUL HUPPERT.